United States Patent [19]

Wan et al.

[11] Patent Number: 4,714,694

[45] Date of Patent: Dec. 22, 1987

[54] ALUMINUM-STABILIZED CERIA CATALYST COMPOSITIONS, AND METHODS OF MAKING THE SAME

[75] Inventors: Chung-Zong Wan, Somerset; Joseph C. Dettling, Howell, both of N.J.

[73] Assignee: Engelhard Corporation, Menlo Park, N.J.

[21] Appl. No.: 880,270

[22] Filed: Jun. 30, 1986

[51] Int. Cl.$^4$ .......................... B01J 23/10; B01J 23/56
[52] U.S. Cl. .................................... 502/304; 502/332; 502/333; 502/334; 502/355; 502/439; 502/527
[58] Field of Search ............... 502/527, 304, 439, 355, 502/327, 332, 333, 334; 423/266

[56] References Cited

U.S. PATENT DOCUMENTS

| | | | |
|---|---|---|---|
| 4,087,384 | 5/1978 | Davis | 502/333 |
| 4,157,316 | 6/1979 | Thompson et al. | 502/334 |
| 4,231,900 | 11/1980 | Kato et al. | 502/333 |
| 4,276,203 | 6/1981 | Pfefferle | 502/333 |
| 4,335,023 | 6/1982 | Dettling et al. | 502/334 |
| 4,492,769 | 1/1985 | Blanchard et al. | 502/304 |
| 4,537,873 | 8/1985 | Kato et al. | 502/304 |
| 4,585,752 | 4/1986 | Ernest | 502/327 |

Primary Examiner—Andrew H. Metz
Assistant Examiner—Anthony McFarlane

[57] ABSTRACT

A catalyst material comprises an aluminum-stabilized ceria which optionally may be combined with an activated alumina and may also comprise one or more platinum group metal catalytic components. A method of making the material includes impregnating bulk ceria or a bulk ceria precursor with an aluminum compound and calcining the impregnated ceria to provide an aluminum-stabilized ceria. The bulk ceria advantageously comprises a high purity (at least 90 weight percent $CeO_2$) ceria and may be admixed with activated alumina having one or more platinum group metal catalytic components dispersed thereon. The catalyst material may be coated onto a suitable carrier substrate and then calcined. Specified minimum levels of the aluminum-stabilized bulk ceria are advantageously employed in the catalyst materials of the invention. The bulk ceria may have one or more preferably non-rhodium platinum group metal catalytic components dispersed thereon, e.g., a platinum catalytic component, and one or more platinum group metal catalytic components dispersed on the activated alumina.

52 Claims, No Drawings

ALUMINUM-STABILIZED CERIA CATALYST COMPOSITIONS, AND METHODS OF MAKING THE SAME

BACKGROUND OF THE INVENTION

1. Field Of The Invention

The present invention is concerned with improvements in catalysts useful for the treatment of gases to reduce contaminants contained therein. More specifically, the present invention is concerned with improved catalysts of the type generally referred to as "three-way conversion" or "TWC" catalysts. These TWC catalysts are polyfunctional in that they have the capability of substantially simultaneously catalyzing the oxidation of hydrocarbons and carbon monoxide and the reduction of nitrogen oxides.

2. Background and Prior Art

Catalysts as described above find utility in a number of fields including the treatment of the exhaust from internal combustion engines, such as automobile and other gasoline-fueled engines. Emissions standards for unburned hydrocarbons, carbon monoxide and nitrogen oxides contaminants have been set by various governments and must be met, for example, by new automobiles. In order to meet such standards, so-called catalytic converters containing a TWC catalyst are emplaced in the exhaust gas line of internal combustion engines. The catalysts promote the oxidation by oxygen in the exhaust gas of the unburned hydrocarbons and carbon monoxide and the reduction of nitrogen oxides to nitrogen. If the engine operation is too rich in fuel to provide sufficient oxygen inherently in the exhaust gas, oxygen may be introduced into the exhaust gas as required. The use of separate catalyst beds to promote, respectively, oxidation and reduction, is known and it is also known to use a catalyst system combined in a single bed to substantially simultaneously promote both the oxidation and reduction reactions as described above. It is these types of polyfunctional catalyst systems that are generally referred to as TWC catalysts, as noted above. A great deal of activity has been engendered in the field in an attempt to economically produce catalysts which exhibit good activity and long life in promoting the conversion of hydrocarbons, carbon monoxide and nitrogen oxides, even when contained in very small quantities in a gas stream, to innocuous substances such as carbon dioxide, water and nitrogen. For this purpose, catalysts comprising one or more platinum group metals distended upon a high surface area support are well known in the art. The support may comprise a high surface area alumina coating carried on a carrier such as a monolithic carrier comprising a refractory ceramic honeycomb structure, as well known in the art. The carrier may also comprise refractory particles such as spheres or short, extruded segments of a refractory material such as alumina.

Thus, typical catalyst compositions comprise a minor amount of platinum or palladium, preferably including one or more of rhodium, ruthenium and iridium, in particular rhodium, as a platinum group metal component. The platinum group metal component is typically dispersed on a high surface area alumina material which enhances the catalytic activity of the material by dispersing the catalytically active platinum group metal components on a very high surface area support layer. Typically loosely referred to in the art as "gamma alumina" or "activated alumina", such high surface area alumina materials typically exhibit a BET surface area in excess of 60 $m^2/g$, often in excess of 80 $m^2/g$, e.g., up to about 150 or 200 $m^2/g$ or more. Such activated alumina is usually a mixture of the gamma and delta phases of alumina, but may also contain substantial amounts of eta, kappa and theta alumina phases.

A common deficiency associated with supported catalyst systems is thermal degradation of the catalyst support from extended exposure to high exhaust gas temperatures of the automotive or other internal combustion engine. In a moving vehicle for example, exhaust temperatures can reach 1000° C., and such elevated temperatures cause the support material to undergo a phase transition with accompanying volume shrinkage, especially in the presence of steam, whereby the catalytic metal becomes occluded in the shrunken support medium with a loss of exposed catalyst surface area and a corresponding decrease in activity. It is a known expedient in the art to stabilize the alumina against such thermal degradation by the use of materials such as zirconia, titania, alkaline earth metal oxides such as baria, calcia or strontia or, most usually, rare earth metal oxides, for example, ceria, lanthana and mixtures of two or more rare earth metal oxides. For example, see U.S. Pat. No. 4,171,288 of Carl D. Keith, et al.

Polyfunctional or three-way conversion catalysts, which serve to substantially simultaneously oxidize hydrocarbons and carbon monoxide and reduce nitrogen oxides, usually require that the ratio of air to fuel ("A/F ratio") introduced into the engine whose exhaust gas is being treated, be at or within a narrow deviation from the stoichiometric ratio. A problem with TWC systems is the adverse effect on catalyst activity caused by the use in automobiles of high A/F ratios which cause greater than stoichiometric oxygen concentration in the exhaust gases. To achieve optimal, substantially simultaneous redox reactions with conventional TWC systems requires the A/F ratio to be in the vicinity of stoichiometric. The use of high A/F ratios in automobile engines improves the fuel economy of the engine, but the presence of excess oxygen in the exhaust, referred to in the art as a "lean exhaust", reduces the activity of platinum group metal catalysts, as platinum is readily sintered at elevated temperatures in a lean exhaust atmosphere, thus reducing the available metal surface area of the catalyst. To achieve optimal simultaneous redox reactions in the exhaust using conventional catalysts, the A/F ratio must be in the vicinity of the stoichiometric A/F since the immediate vicinity of the stoichiometric A/F forms the TWC "window" where the catalyst efficiency is high for the conversion for all three, i.e., hydrocarbon, carbon monoxide and nitrogen oxide, pollutants.

Lean exhaust conditions also have a detrimental effect on the rhodium catalyst. In the *Journal of Catalysis*, Volume 50, pages 407–418 (December, 1977) in an article entitled, "Surface Interaction in the System Rh/Al$_2$O$_3$", the authors report that rhodium interacts strongly with gamma alumina. Under lean exhaust conditions at elevated temperatures, rhodium interacts with and diffuses into the gamma alumina particles. Thus, exposure of gamma alumina supported rhodium containing TWC systems to lean exhaust conditions results in a reduction in activity believed to be due to a loss of rhodium accessibility to the exhaust system.

The art has devised various methods to improve the catalyst efficiency of Pt/Rh based TWC systems and widen the TWC window. For example, to reduce the rhodium-gamma alumina support interactions, the art has suggested substituting alpha-alumina (U.S. Pat. No. 4,172,047) or zirconia (U.S. Pat. No. 4,233,189) as a support material which is not interactive with rhodium. However, alpha-alumina and zirconia are relatively low surface area materials, which is disadvantageous as catalyst activity in such use depends to a certain extent on the surface of the support. During the operation of the vehicle, various catalyst poisons such as lead, zinc and phosphorus are generated from the consumption of fuel and engine oil and deposit non-selectively on the active surfaces of the catalyst metals thereby reducing the available metal surface area of the metal catalyst. As the initial surface area of the TWC material is already low due to the use of the low surface area alpha-alumina or zirconia, the deposition of the poisons may accelerate loss of activity by the TWC system to an unacceptable level.

U.S. Pat. Nos. 3,993,572 and 4,157,316 represent attempts to improve the catalyst efficiency of Pt/Rh based TWC systems by incorporating a variety of metal oxides, e.g., rare earth metal oxides such as ceria and base metal oxides such as nickel oxides, in the TWC system. Thus, in an article entitled "Three Way Catalyst Response To Transient" in Ind. Eng. Chem. Prod. Res. Dev. 1980, 19, 288–293 the authors, Schlatter et al report that the operating environment of three-way catalysts is characterized by oscillations of the feed stream composition which occur with a frequency in the order of 1 Hz. It has been suggested that the incorporation of an "oxygen storage" component in the catalyst moderates the effects of the rapid changes between rich and lean exhaust stoichiometries. The authors question the validity of the conventional explanation that the storage component adsorbs excess oxygen during excursions on the lean side of the stoichiometric set point and releases it during subsequent excursions on the rich side. The authors also suggest that the presence of cerium on the rhodium-impregnated spheres in a "fresh" three-way catalyst enhances the performance of the catalyst under transient or oscillating feed stream conditions by increasing either the amount or the stability of the oxidized rhodium species. In a later article, published in the same journal, entitled "Ceria-Promoted Three-Way Catalysts for Auto Emissison Control" Ind. Eng. Chem. Prod. Res. Dev. 1982, 21, 274–288, the author, Kim reports that ceria is the best non-noble metal oxide promoter for a typical Pt-Pd-Rh TWC supported on alumina catalyst largely because it enhances the water-gas shift reaction ($CO + H_2 + CO_2 + H_2$) and possibly due, in part, to the additional oxygen storage it provides to the TWC.

U.S. Pat. No. 4,539,311 discloses a catalyst for treating motor vehicle exhaust fumes which catalyst is said to have an improved tolerance for lead. A high surface area alumina is impregnated first with a barium moiety, such as an aqueous solution of a barium compound which decomposes to produce barium oxide on firing at over 400° C., and, after such firing, is subsequently impregnated with a dispersion of a platinum group metal moiety such as by soaking the alumina in an aqueous solution of a metal compound which on firing at over 400° C. decomposes to leave behind either the platinum group metal or a compound which converts to the metal when the catalyst is placed in use. The catalyst is made by coating a honeycomb support with alumina incorporating ceria. The dried and calcined alumina coating was then soaked in an aqueous solution of barium nitrate, dried and fired and then soaked in an aqueous solution of chloroplatinic acid, dried and fired. The firing steps were carried out at 550° C.

U.S. Pat. No. 4,294,726 discloses a TWC catalyst composition containing platinum and rhodium obtained by impregnating a gamma alumina carrier material with an aqueous solution of cerium, zirconium and iron salts or mixing the alumina with oxides of, respectively, cerium, zirconium and iron, and then calcining the material at 500° to 700° C. in air after which the material is impregnated with an aqueous solution of a salt platinum and a salt of rhodium dried and subsequently treated in a hydrogen-containing gas at a temperature of 250°–650° C. The alumina may be thermally stabilized with calcium, strontium, magnesium or barium compounds. The ceria-zirconia-iron oxide treatment is followed by impregnating the treated carrier material with aqueous salts of platinum and rhodium and then calcining the impregnated material.

U.S. Pat. No. 4,504,598 discloses a process for producing a high temperature resistant TWC catalyst. The process includes forming an aqueous slurry of particles of gamma or activated alumina and impregnating the alumina with soluble salts of selected metals including cerium, zirconium, at least one of iron and nickel and at least one of platinum, palladium and rhodium and, optionally, at least one of neodymium, lanthanum, and praseodymium. The impregnated alumina is calcined at 600° C. and then dispersed in water to prepare a slurry which is coated on a honeycomb carrier and dried to obtain a finished catalyst.

European Patent Application No. 0152052, published Aug. 21, 1985, discloses a monolithic TWC catalyst prepared by impregnating an active alumina powder with a soluble platinum compound, calcining the impregnated powder and then mixing it with a hydrous cerium hydroxide powder, the particle size and water content of which is controlled to assure dispersibility. The mixture is pulverized in a dilute nitric acid solution to prepare a coating slurry which is deposited upon a monolithic support, dried and then calcined. The monolithic support was then impregnated with an aqueous solution of a rhodium salt and dried to provide a finished catalyst.

Japanese Patent Publication 59-127649 published July 23, 1984 (Application Number 58/1983-336) discloses a TWC and monolithic catalyst having a first base layer of activated alumina supporting platinum, palladium, cerium and lanthanum catalytic elements and a second, upper layer of alumina on which rhodium, iron and lanthanum is dispersed. A first alumina slurry comprising alumina particles impregnated with cerium nitrate and lanthanum nitrate is prepared and coated upon the monolith, dried and calcined at 700° C. The coated monolith was then immersed in an aqueous solution of the platinum compound and dried to form the first layer. Another alumina slurry was prepared with the alumina particles impregnated with lanthanum nitrate and ferric nitrate and calcined and coated onto the monolithic carrier containing the first alumina layer. The monolith was thereafter immersed in an aqueous rhodium compound solution and withdrawn and dried to provide the upper layer.

COPENDING, COMMONLY OWNED PATENT APPLICATIONS

The following copending U.S. patent applications, the disclosure of each of which is incorporated by reference herein, are owned by the assignee of this application and disclose three-way catalyst compositions particularly adapted for treating the exhaust gases of internal combustion engines.

Catalyst compositions which are particularly useful in the treatment of exhaust gases of internal combustion engines operated at a lean air-to-fuel ratio are disclosed in the following copending U.S. patent applications: Ser. No. 832,499, filed Feb. 20, 1986 as a continuation-in-part ("CIP") of Ser. No. 620,415, filed June 14, 1984, both in the name of C. Z. Wan et al and entitled "Three-Way Catalyst For Lean Operating Engines"; Ser. No. 842,746, filed Mar. 17, 1986 as a CIP of Ser. No. 696,950, filed Jan. 31, 1985, itself a CIP of the aforesaid Ser. No. 620,415, both in the name of C. Z. Wan et al and entitled "Three-Way Catalyst For Lean Exhaust Systems"; Ser. No. 772,296, filed Sept. 4, 1985 as a continuation-in-part of Ser. No. 696,947, filed Jan. 31, 1985, itself a CIP of the aforesaid Ser. No. 620,415, both in the name of C.Z. Wan et al and entitled "Three-Way Catalysts of Improved Efficiency". The catalyst compositions disclosed in these applications comprise rhodium and a second platinum group metal selected from platinum, palladium and mixtures thereof and rare earth metal oxides. The rhodium, or at least a substantial portion of it, is dispersed on particles which are substantially free of rare earth metal oxides, the inventors having discovered that, during extended use of the TWC catalyst under high temperature conditions, the rhodium metal content of a rare earth-promoted TWC on alumina catalyst interacts with the rare earth metal. This aggravates the deleterious effect on catalyst activity of the interaction between rhodium and gamma alumina, noted above with reference to the *Journal of Catalysis* article. In order to overcome the problem of rhodium-rare earth metal oxide interactions, the rhodium content is dispersed on alumina particles which are substantially free of rare earth metal oxides and which preferably have an alkaline earth metal oxide combined therewith. The second platinum group metal (platinum and/or palladium) is preferably dispersed on alumina particles which have a rare earth metal oxide combined therewith or may be dispersed on particles of a rare earth metal oxide or particles of alumina. The rhodium particles preferably have an initial average particle size greater than 30 Angstrom in diameter to further reduce interaction of the rhodium with the support. Thus, at least two different types of particles are included in the catalytic coating, which may be dispersed on a monolithic carrier means. The first type of particle comprises rhodium and, optionally, platinum and/or palladium, dispersed on a high surface area alumina which is substantially free of rare earth metal oxides. The second type of particle comprises platinum and/or palladium dispersed on a high surface area alumina which may optionally include rare earth metal oxides either as a thermal stabilizer for the alumina or as an active catalytic species. Optionally, a third type of particle comprising a bulk rare earth metal oxide, optionally having platinum and/or palladium thereon, may also be utilized.

Copending U.S. patent application Ser. No. 722,905, filed Apr. 12, 1985 in the name of C. Z. Wan et al and entitled "High Temperature Catalyst Compositions For Internal Combustion Engine" discloses a TWC catalyst adapted for treating exhaust gases from heavy duty truck engines. This catalyst uses at least three types of catalytic particles dispersed as a coating upon a ceramic substrate as follows: thermally stabilized activated alumina particles having a platinum group metal dispersed thereon, catalytic promoter metal oxide particles which are substantially free of platinum group metal, and particles of an inert, thermally stable, filler material. The stabilized alumina support material may be thermally stabilized with lanthanum/baria materials, the catalytic promoter oxides may be selected from oxides of chromium, titanium, zirconium and cerium and the inert thermally stable filler material may be particles of one or more of cordierite, mullite, magnesium aluminum titanate and the like.

SPECIFIC PRIOR ART PROBLEM

Generally, dispersal of $CeO_2$ on an alumina support, for example, by impregnating the alumina with a solution of a suitable cerium compound and calcining the impregnated alumina, is widely used in the prior art to provide a desirable oxygen storage capacity of catalytic materials. However, it has been determined that high surface area bulk ceria, i.e., particles of solid ceria, exhibits higher oxygen storage capacity than that of $CeO_2$ dispersed on an alumina support by an impregnation technique as described above. It is speculated that $CeO_2$ dispersed on an alumina support induces significant interaction between the $CeO_2$ and the alumina support, resulting in a less active $CeO_2$ species. However, one problem associated with the use of high surface area bulk ceria is that the surface area of the bulk ceria deteriorates quite rapidly after exposure to high temperatures, for example, temperatures greater than 700° C., which results in an appreciable loss of the ceria oxygen storage function. Thus, it is highly desirable to provide for improving the thermal degradation resistance of high surface area bulk ceria, as provided for by the present invention.

SUMMARY OF THE INVENTION

In accordance with the present invention there is provided a method of making a catalyst composition comprising an aluminum-stabilized ceria. The method comprises the step of (a) impregnating ceria or a ceria precursor with a liquid dispersion of an aluminum-stabilzer precursor; and (b) calcining the impregnated ceria obtained from step (a).

Another aspect of the invention includes dispersing one or more non-rhodium platinum group metal catalytic components, e.g., platinum, on the ceria. When the bulk ceria is to be admixed with activated alumina in a catalyst composition, it is advantageous to disperse the non-rhodium platinum group metal onto the bulk ceria before mixing the bulk ceria with the alumina in order to insure that a controlled amount of dispersed metal is deposited on the ceria in preference to the alumina.

In one aspect of the invention, the liquid dispersion of the aluminum-stabilizer precursor comprises an aqueous solution of an aluminum compound, e.g., aluminum nitrate, with which the ceria or ceria precursor is impregnated.

Another aspect of the invention provides for incorporating sufficient aluminum-stabilizer precursor into the ceria to provide not more than about 20, preferably not more than about 10, more preferably about 0.05 to 5, weight percent aluminum, measured as $Al_2O_3$, based on the total weight of the stabilized ceria.

Yet another aspect of the invention provides for mixing with the stabilized ceria an activated alumina on which one or more platinum group metal catalytic components may be dispersed, to form a mixture of alumina and aluminum-stabilized ceria.

The calcining of step (b) may be carried out at a temperature of from about 300° C. to about 1000° C., preferably from about 300° C. to about 600° C., for a period of about ½ to about 2 hours or more, e.g., in air. The ceria and alumina may be mixed in proportions to provide a catalyst material comprising from about 5 to 95 weight percent stabilized ceria, and a coating of the alumina-ceria mixture may be applied to a carrier substrate.

In accordance with another aspect of the invention there is provided a catalyst composition comprising one or more non-rhodium platinum group metal components dispersed on aluminum-stabilized ceria containing not more than about 20, preferably not more than 10, e.g., from about 5 to 10, more preferably about 0.05 to 5, weight percent aluminum, measured as $Al_2O_3$, based on the total weight of the stabilized ceria.

The catalyst composition of the invention may further include activated alumina having one or more platinum group metal components dispersed thereon.

Other aspects of the invention include providing the catalyst material, e.g., the aluminum-stabilized ceria and, optionally, the activated alumina plus the catalytic components respectively dispersed thereon, as a calcined coating on a carrier substrate.

The ceria may comprise at least about 90, preferably at least about 95, more preferably at least about 99.5, weight percent $CeO_2$ of the weight of total bulk ceria exclusive of its aluminum content.

Other aspects of the invention will be appreciated from the following description.

DETAILED DESCRIPTION OF THE PREFERRED EMBODIMENTS

The catalysts of the present invention may take the form of a coated carrier substrate, such as a monolithic ceramic or metal honeycomb or a carrier substrate made of a foamed ceramic or metal material on which a coating of catalytic material is applied. Thus, the catalytic material may be provided in the form of a catalytic coating applied to a monolithic honeycomb element, usually comprising a cylindrical shaped member having a plurality of fine, parallel gas flow passages extending therethrough. Typically, there may be from 60 to 600 or more such parallel fine gas flow passages per square inch of the face of the honeycomb member, the walls of these passages being coated with the catalytic material. The coating of catalytic material may be applied by dipping the monolith into a slurry of the catalyst particles in water. The monolithic honeycombs may be made from metals such as corrosion-resistant stainless steel, or more typically, from ceramic type materials comprising refractory crystalline materials such as sillimanite, magnesium silicates, zirconia, petalite, spodumene, cordierite, mullite, alumino-silicates or combinations of such materials. Generally, such materials comprise varying compositions of silica-magnesia-alumina and have some surface porosity. The catalysts are made of refractory inorganic oxides, typically alumina, or alumina with one or more other oxides as additives for increased strength, heat-resistance, etc.

The catalyst composition of the invention generally comprises an aluminum-stabilized ceria in bulk form, on which one or more non-rhodium catalytic components may be dispersed, optionally mixed with an activated alumina support on which one or more platinum group metal catalytic components may be dispersed. The activated alumina, as described above, provides a high surface area support which is believed to enhance the catalytic activity of the catalytic components dispersed thereon and may also serve as a binder for the catalytic composition. The aluminum-stabilized ceria, which is preferably a high surface area ceria, is believed to serve as a promoter for oxidation-reduction reactions, providing a synergistic effect to the non-rhodium platinum group metal catalytic component dispersed thereon.

Ceria in bulk form, i.e., solid, fine particulate ceria having a particle size distribution such that at least about 95% by weight of the particles have a diameter greater than 0.5 microns, is known to promote oxidation and reduction reactions. It is advantageous to mix bulk ceria, i.e., solid particles of ceria, with particles of activated alumina so that the ceria is present in solid or bulk form as opposed to, for example, impregnating the alumina particles with a solution of a cerium compound-which, upon calcination, is converted to ceria dispersed on the alumina. Dispersed ceria or other cerium compound as a modifier, i.e., a promoter and/or thermal stabilizer, for alumina may of course be used in addition to bulk ceria in a catalyst composition. Other promoters for oxidation and reduction reactions may also be included in the catalyst composition, for example, oxides of one or more of manganese, vanadium, copper, iron, cobalt, chromium, zirconium, nickel and the like. Such materials may be introduced as the oxide or as a precursor which is converted to the oxide upon calcination or upon use of the catalyst. For example, TWC catalysts comprising a platinum group metal and a base metal oxide selected from oxides of metals having an atomic number from 25 to 28 plus rhenium and mixtures thereof, are disclosed in U.S. Pat. No. 4,157,316 of C. E. Thompson et al. Such oxidation-reduction promoters may be incorporated in bulk form and are usually incorporated in the catalytic composition in amounts ranging from about 0.05 to about 50% by weight, preferably from about 0.5 to about 25% by weight of the catalytic material.

It is an aspect of the present invention that beneficial effects are attained by utilizing a high proportion of aluminum-stabilized bulk ceria of suitably high surface area in the catalytic composition of the invention. The catalytic composition, exclusive of the weight of the carrier substrate, may comprise from about 5 to about 95 weight percent of the aluminum-stabilized ceria. That is, about 5 to about 95 weight percent of the "washcoat" of catalytic material applied to a carrier substrate may be provided for the aluminum-stabilized ceria. It has been observed that the promoting effects of the ceria are enhanced and catalysts of high activity and durability are attained by providing increased quantities of aluminum-stabilized bulk ceria in the catalytic coating. The aluminum-stabilized bulk ceria has been found to provide improved surface area retention after high temperature exposure as compared to otherwise equivalent bulk ceria which has not been aluminum-stabilized. Because the aluminum-stabilized ceria is superior in terms of retaining its high surface area, it is feasible and useful to impregnate the bulk ceria with a non-rhodium platinum group metal catalytic component. The aluminum-stabilization of the bulk ceria may also improve the resistance of the catalyst to poisoning by known catalyst poisons such as lead, phosphorus and their compounds.

In preparing the aluminum-stabilized ceria of the present invention, bulk ceria or bulk ceria precursor such as cerium carbonate, cerium hydroxide, etc., may be impregnated with a liquid dispersion of any suitable aluminum-stabilizer precursor, such as aluminum nitrate, aluminum chloride, aluminum oxychloride, aluminum acetate, etc. After drying and calcining the impregnated ceria at a temperature of from 300° C. to about 600° C. for a period of from about one-half to about two hours in air, the aluminum precursor is converted to an effective aluminum-stabilizer for the bulk ceria. If a bulk ceria precursor was used, it is converted to bulk ceria by the calcination. (The term "aluminum-stabilized" is used herein and in the claims to designate the ceria treated with an aluminum compound in accordance with the present invention, even though the aluminum is probably present in the ceria as a compound, presumably, alumina, and not as the element).

In an alternate method of preparing the aluminum-stabilized ceria, the bulk ceria or a bulk ceria precursor may be ballmilled in an aqueous medium containing the aluminum-stabilizer precursor and then applied to a carrier substrate in the form of a thin coating. After calcining, the aluminum precursor in the coating is converted to an effective aluminum-stabilizer for the bulk ceria initially used, or resulting from calcination of the ceria precursor. Yet another method to prepare the aluminum-stabilized bulk ceria may be achieved by co-precipitation of a ceria precursor, e.g., cerium nitrate and an aluminum precursor, e.g., aluminum nitrate from a solution. Drying and calcining the precipitate provides an aluminum-stabilized bulk ceria. The aluminum-stabilized precursor, in order to be sufficiently incorporated into the bulk ceria, generally comprises not more than about 20, preferably not more than about 10, more preferably about 0.05 to 5, weight percent aluminum, measured as $Al_2O_3$, based on the total weight of the aluminum-stabilized ceria. Since it is advantageous to impregnate the aluminum-stabilized bulk ceria with a non-rhodium platinum group metal especially platinum in order to enhance catalytic activity of the resultant catalytic material, desired or optimal content of aluminum in the aluminum-stabilized bulk ceria will depend on the ceria purity and other properties, the platinum or other catalytic metal loading, and the catalyst operating conditions.

In any case, in accordance with another aspect of this invention, it is desirable to provide at least 1 square meter/in$^3$ of aluminum-stabilized bulk ceria in the composition of the catalyst. Generally, it is preferred to provide from about 0.1 to about 3 grams per cubic inch of such ceria. These would provide in the finished catalyst a contribution to surface area of the aluminum-stabilized bulk ceria of from about 1 to 300 square meters of ceria per cubic inch of catalyst, say from 10 to 250 square meters of ceria per cubic inch of catalyst.

In accordance with another aspect of the present invention, a beneficial effect is provided by utilizing as the aluminum-stabilized bulk ceria a ceria of high purity, and dispersing at least a portion of the non-rhodium platinum group metal catalyst components on the stabilized bulk ceria. As indicated by the Examples presented later in this application, additional benefits can be attained by utilizing as the bulk ceria a ceria of at least about 95 (or at least about 99 or 99.5) percent by weight $CeO_2$, as measured prior to aluminum-stabilization of the bulk ceria. The predominant impurity in commercially available cerias comprises lanthana with lesser amounts of other rare earth metal oxides.

It is conventional wisdom in the art that the platinum group metal catalytic component should be dispersed on a high surface area material, e.g., activated alumina, with which it is compatible. However, as noted above, it has been found advantageous in the practice of the present invention to also disperse a platinum group metal component, other than a rhodium component, onto the aluminum-stabilized bulk ceria. The bulk ceria used preferably has an acceptably high surface area, which may be on the order of at least about 100m$^2$/g, e.g., about 140–180 m$^2$/g, although lower surface area ceria may also be employed. It has further been found to be advantageous if the ceria or ceria precursor is a high purity ceria, such as a low temperature calcined ceria comprising at least about 90, preferably at least about 95, weight percent $CeO_2$. An aluminum-stabilized high surface area ceria containing at least about 95 percent $CeO_2$ and having a platinum catalytic component distended thereon, provides better platinum activity than an otherwise identical composition in which the ceria is not aluminum-stabilized. Improved catalytic activity of a platinum-containing catalyst made with 99.9 weight percent $CeO_2$ in comparison to that of a platinum-containing catalyst made with 95 weight percent $CeO_2$ mixture was demonstrated with respect to hydrocarbon, CO and $NO_x$ conversion. It is therefore expected that an aluminum-stabilized high purity ceria, e.g., using 99.9 weight percent $CeO_2$ ceria, would display even better catalytic activity while providing improved thermal stability and durability.

One or more platinum group metal catalytic components may be dispersed on activated alumina, typically by impregnating the activated alumina, which is usually in the form of a fine powder, with solutions of soluble compounds of the catalytic metals or liquid dispersions of complexes of the catalytic metal compounds. The activated alumina may also be impregnated with one or more modifiers, e.g., promoters or stabilizers, to enhance catalytic activity, durability and/or thermal stability of the catalytic material as described below.

As explained in detail in the aforementioned copending and Commonly Owned patent applications, it may be desired to impregnate a portion of the activated alumina with one catalytic metal component and another portion of the activated alumina with another catalytic metal component and then combine the two separately impregnated batches of activated alumina to make the catalytic material of the invention. Thus, in the case of preparing a platinum/palladium/rhodium TWC catalytic material, a rhodium compound is placed into solution and the solution (which optionally may also contain soluble compounds of platinum and/or palladium) is contacted with activated alumina particles which are substantially free of rare earth oxides. The reason for this is the discovery (which forms no part of the present invention) that intimate contact between rhodium and rare earth metal oxides has a deleterious effect on operation of the catalyst. In any case, the rhodium compound-impregnated gamma alumina particles are combined with another batch of activated alumina which has separately been impregnated with platinum and palladium compounds in a similar fashion. The platinum and palladium impregnated alumina advantageously may contain modifiers as described below, impregnated into the alumina in the same manner as the catalytic metal compounds. The separate impregnated batches of alumina and aluminum-stabilized bulk ceria are combined in a liquid medium such as water to provide a slurry of the mixed impregnated particles in a liquid. The carrier substrate members may be dipped into the slurry to fill the gas flow passages thereof, whereupon excess slurry is blown out of the carrier substrates with compressed air and the substrates are dried to leave behind a catalytic coating of the impregnated alumina particles and aluminum-stabilized bulk ceria particles on the walls of the fine, gas flow passages. The coated carrier substrate is then calcined in air to drive off the liquid and fix the catalyst on the alumina support, leaving behind a thin, strongly adherent catalytic coating on the monolithic carrier substrate.

As noted above, modifiers may optionally be employed in activated-alumina containing catalyst compositions in accordance with the present invention. Among such modifiers are thermal stabilizers which serve to retard undesirable alumina phase transitions (e.g., gamma to alpha alumina) at elevated temperatures which the catalyst may encounter in use. The thermal stabilizers may be any know stabilizer or combination of stabilizers such as, for example, one or more rare earth metal oxides, silicon dioxide, oxides of Group IVB metals (zirconium, hafnium and titanium) or one or more alkaline earth metal oxides. Other modifiers such as oxides of chromium, iron, and nickel, or their precursors, may also be employed. Some modifiers may serve more than one function, e.g., may serve as both a thermal stabilizer and a catalytic promoter. These materials, or precursors thereof, may be impregnated from a solution or liquid dispersion into the activated alumina particles either before or after the particles are formed into an adherent coating on the carrier substrate. (As used herein and in the claims, a "precursor", whether of a thermal stabilizer, other modifier or other component, is a compound, complex or the like which, upon calcining or upon use of the catalyst, will decompose or otherwise be converted into, respectively, a thermal stabilizer, other modifier or other component.) The presence of one or more of these metal oxide stabilizers tends to retard the phase transition of high surface area aluminas such as gamma and eta aluminas to alpha-alumina, which is a low surface area alumina. The retardation of such phase transformation tends to prevent or reduce the occlusion of the catalytic metal component by the alumina with the consequent decrease of catalytic activity. The amount of metal oxide stabilizer combined with the alumina may be from about 0.05 to 30 weight percent, preferably from about 0.1 to 25 weight percent, based on the total weight of the combined alumina, stabilizer and catalytic metal component. Alkaline earth metal oxides which may be used to stabilize activated alumina are oxides of barium, strontium, calcium and magnesium. Among the rare earth metal oxides which may be similarly employed in the catalyst are oxides of cerium, lanthanum, neodymium, praseodymium and mixtures thereof, including the commercially available mixtures of rare earth metal oxides.

With respect to the amount of platinum group metal catalytic component utilized in the catalyst, it is of course desired to minimize the amount of these expensive materials, consistent with providing an effective catalyst. Since the amount of platinum and palladium occurring in naturally mined ores is much greater than the amount of rhodium occurring in such ores, the proportion of platinum (and palladium, when palladium is utilized) is usually significantly higher than that of rhodium in the catalyst. Thus, the combined weight of platinum, or of platinum and palladium, is usually in excess of twice the amount of rhodium, preferably at least four times the amount of rhodium, and most preferably at least ten times the amount of rhodium present. The total weight of platinum group metal catalytic component utilized, measured as the metal, typically will not exceed about 10 weight percent of the weight of the catalytic material, for example, it will comprise from about 0.01 to about 8%, more preferably from about 0.05 to 5 weight percent of the catalytic material. In this context, reference to the "catalytic material" is to the material comprising aluminum-stabilized ceria, catalytic components and, if present, alumina, modifiers such as stabilizers and/or reaction promoters, and excludes the monolithic carrier substrate. When the catalytic material is applied as a thin coating to a monolithic carrier substrate, the proportions of ingredients are conventionally expressed as grams of material per cubic inch of catalyst as this measure accommodates different gas flow passage cell sizes in different monolithic carrier substrates. For typical automotive exhaust gas catalytic converters, the catalyst composition (catalyst material plus monolithic substrate) generally may comprise from about 0.25 to about 4.0, preferably about 0.25 to about 3.0 g/in$^3$ aluminum-stabilized ceria plus, if present, alumina, about 0 to about 25, preferably about 0.05 to about 15 g/ft$^3$, rhodium and about 0.5 to about 150, preferably about 1 to about 90 g/ft$^3$, of platinum and/or palladium.

In preparing the catalyst, a platinum group metal catalytic component such as a suitable compound and/or complex of any of the platinum group metals may be utilized to achieve dispersion of the catalytic component on the aluminum-stabilized ceria and/or activated alumina particles or coating. (As used herein and in the claims, the term "platinum group metal catalytic component" means any platinum group metal compound, complex, or the like which, upon calcination or use of the catalyst decomposes or otherwise converts to a catalytically active form, usually, the metal. Water soluble compounds or water dispersible complexes as well as organic soluble or dispersible compounds or complexes of one or more platinum group metals may be utilized as long as the liquid used to impregnate or deposit the catalytic metal compounds onto the alumina support particles or coating do not adversely react with the catalytic metal or its compound or complex or the other components of the catalytic material, and are capable of being removed from the catalyst by volatilization or decomposition upon heating and/or the application of vacuum. In some cases, the completion of removal of the liquid may not take place until the catalyst is placed into use and subjected to the high temperatures encountered during operation. Generally, both from the point of view of economics and environmental aspects, aqueous solutions of soluble compounds or complexes of the platinum group metals are preferred. For example, suitable compounds are chloroplatinic acid, potassium platinum chloride, ammonium platinum thiocyanate, amine solubilized platinum hydroxide, rhodium chloride, rhodium oxide, rhodium sulfide, rhodium nitrate, hexamine rhodium chloride, etc. If both platinum and palladium are to be impregnated onto the activated alumina particles, both are preferably in water soluble form such as, for example, as the respective amine hydroxide or as chloroplatinic acid, palladium nitrate or palladium chloride. During the calcination step, or at least during the initial phase of use of the catalyst, such compounds are converted into a catalytically active form of the platinum group metal or a compound thereof.

Generally, the catalyst materials of the present invention provide improved compositions utilizing aluminum-stabilized bulk ceria and the following Examples show the preparation and utilization of catalysts comprising specific embodiments of the present invention.

EXAMPLE I

A. A bulk ceria contains 95% $CeO_2$ and minor amounts of other rare earth metal oxide constituents. The ceria has a particle size of 90% by weight of the particles having a diameter greater than 10 microns. It exhibits 140 $m^2/g$ surface area measured by the known BET method, a pore volume of 0.12 c.c/g and an X-ray diffraction-measured ("XRD") $CeO_2$ crystallite size at (311) reflection of 75 Angstroms.

B. The ceria of Part A was impregnated with an aqueous solution containing aluminum nitrate. After drying and calcining at 450° C. in air for one hour, an aluminum-stabilized ceria containing 2.5 percent by weight $Al_2O_3$ was obtained. The aluminum-stabilized ceria demonstrates a BET surface area of 120 $m^2/g$.

C. In a separate preparation, a gamma alumina support was impregnated with a solution containing cerium nitrate (95% $CeO_2$ as the rare earth metal oxide constituent). Successive impregnations were used to obtain 30 percent by weight of $CeO2$ based on the combined weight of the $CeO_2$ and alumina. The dispersed-ceria alumina support so obtained was further calcined at 750° C. in air for four hours. The resultant dispersed-ceria alumina displayed a particle size of 90% by weight of the particles having a diameter greater than 15 microns, exhibited 135 $m^2/g$ BET surface area, a pore volume of 0.5 c.c/g and XRD $CeO_2$ crystallite size at (311) reflection of 90 Angstroms.

For purposes of direct comparison, a sample of the bulk ceria A, the aluminum-stabilized ceria B and the dispersed-$CeO_2$ alumina C were each calcined in air in a muffle furnace at 750° C. for 70 hours. After aging, the samples were analyzed for BET surface area and for $CeO_2$ crystallite size by XRD technique. The results are recorded in Table I.

TABLE I

| | The Efficiency Of Aluminum-Stabilization Of $CeO_2$* | |
|---|---|---|
| Sample | BET S.A. $m^2/g$ | XRD $CeO_2$ Crystallite Size Ang |
| Bulk $CeO_2$ (reference) | 9.1 | 220 |
| Al—$CeO_2$ (2.5 wt. % $Al_2O_3$) (present invention) | 21.5 | 110 |
| 30% $CeO_2/Al_2O_3$ (reference) | 130 | 95 |

*After 750° C. air exposure for 70 hours.

The data of Table I demonstrates that introduction of small amounts of aluminum can effectively stabilize the bulk ceria with respect to both the ceria surface area and $CeO_2$ crystallite growth.

EXAMPLE II

A. The aluminum-stabilized bulk ceria prepared in Part B of Example I was ballmilled in distilled water to form a slurry and then impregnated with an aqueous solution of amine solubilized $H_2Pt(OH)_6$. The ceria slurry was then mixed with an alumina slurry (bearing no precious metal) to form a washcoat slurry. A monolith containing 400 cells/$in^2$ was coated with the washcoat slurry so as to have 10 g/$ft^3$ Pt loading after calcining in air at 450° C. The catalyst is designated as catalyst "Example II".

B. For comparison, a series of monolithic catalysts of similar Pt loading were prepared as follows. A gamma alumina powder having a 130 $m^2/g$ BET surface area was impregnated with an aqueous solution of amine solubilized $H_2Pt(OH)_6$. The platinized alumina then was ballmilled in an aqueous solution of 5 weight percent acetic acid to form a washcoat slurry. A monolith identical to that of Part A of this Example was coated with a batch of this slurry so as to have 10 g/$ft^3$ Pt after calcining in air at 450° C. This catalyst is designated as Catalyst "$C_1$".

C. Another batch of the platinized alumina slurry of Part A of this Example was further mixed with a bulk ceria slurry obtained by ballmilling the bulk ceria of Part A of Example I in distilled water to form a washcoat slurry. The coated monolith with the washcoat is designated as Catalyst "$C_2$".

D. A slurry of bulk ceria obtained by ballmilling the bulk ceria of Part A of Example I in distilled water was impregnated with an aqueous solution of amine solubilized $H_2Pt(OH)_6$ and then mixed with a blank alumina slurry to form a washcoat slurry. A monolith identical to that of Part A of this Example was coated with the washcoat to provide a catalyst designated as Catalyst "$C_3$".

E. The 30% dispersed $CeO_2$ alumina of Part C of Example I was impregnated with the amine solubilized $H_2Pt(OH)_6$ solution and then ballmilled in an aqueous solution of 5 weight percent acetic acid to form a washcoat slurry. A monolith identical to that of Part A of this Example was coated with this washcoat to provide a comparative catalyst designated as Catalyst "$C_4$". The activity performance after aging of Catalysts $C_1$, $C_2$, $C_3$ and $C_4$ is compared to Catalyst "Example II" in Table II under the conditions described.

TABLE II

Conversion Efficiency Of Thermally Aged Pt Containing Monolithic Catalysts

| | % Conversion At Stoichiometric A/F Set Point | | |
|---|---|---|---|
| Catalyst | HC ($C_3H_6$) | CO | $No_x$ |
| $C_1$ (no $CeO_2$) | 0 | 1 | 0 |
| $C_2$* | 12 | 14 | 8 |
| $C_3$* | 11 | 14 | 7 |
| $C_4$** | 3 | 7 | 2 |
| Example II* | 69 | 59 | 25 |

*0.6 g/$in^3$ $CeO_2$ and 1.0 g/$in^3$ $Al_2O_3$
**2.0 g/$in^3$ 30% $CeO_2/Al_2O_3$ Catalyst: 10 g/$ft^3$ Pt
Aging: 745° C.±15° C./70 hours/air
Evaluation: 400° C., ±0.5 A/F @1 Hz perturbation, 50,000 VHSV (Flow rate of the gas through the catalyst as volumes of gas at standard temperature and pressure per volume of catalyst. The volume of catalyst is the superficial or geometric volume of the catalyst body.

It is readily noticed from Table II that the Pt catalyst without the $CeO_2$ component incorporated therein was totally deactivated under the severe air aging. However, it is apparent that the catalyst containing platinized, aluminum-stabilized bulk ceria of the present invention is superior to that obtained using a catalyst containing either unstabilized bulk ceria or dispersed ceria of comparable total $CeO_2$ loading. The "dispersed" ceria is ceria dispered from a solution of a cerium compound onto the alumina whereas bulk ceria is, as described above, solid, particulate ceria. Although the dispersed ceria on alumina support is effectively stabilized, a catalyst containing platinum supported on the alumina containing dispersed ceria demonstrates less catalytic-promoting effect than that utilizing the ceria in bulk form.

EXAMPLE III

A. A high purity bulk cerium oxide (99.9% $CeO_2$) is obtained by calcination of a cerium carbonate compound. The ceria has a particle size of 90% by weight of the particles having a diameter greater than 10 microns, exhibits a 160 $m^2/g$ BET surface area, a pore volume of 0.13 cc/g and XRD $CeO_2$ crystallite size at (311) reflection of 65 Angstroms.

B. A portion of the ceria of Part A of this Example was impregnated with an aqueous solution containing aluminum nitrate. After drying and calcining at 450° C. in air for one hour, aluminum-stabilized cerias of various aluminum content were obtained.

For purposes of direct comparison, the bulk ceria of Part A and the aluminum-stabilized cerias of Part B of this Example were calcined in air in a muffle furnace at various temperatures for a period of four hours. After aging, the samples were analyzed for BET surface area and for $CeO_2$ crystallite size by XRD technique. The results are presented in Table III, the data of which clearly demonstrates that an aluminum content as low as 750 ppm measured as $Al_2O_3$ can effectively stabilize the high purity ceria.

TABLE III

| | Thermal Stability Of Aluminum Stabilized High Purity Ceria | | | |
|---|---|---|---|---|
| | 800° C. Aging* | | 1000° C. Aging | |
| Aluminum Content | BET S.A. $m^2/g$ $CeO_2$ | XRD Size Ang. | BET S.A. $m^2/g$ $CeO_2$ | XRD Size Ang. |
| none (reference) | 11.5 | 320 | 2.5 | >500 |
| 750 ppm as $Al_2O_3$ | 17.0 | 260 | 5.0 | 410 |
| 2.5 wt. % as $Al_2O_3$ | 34.0 | 120 | 10.5 | 260 |

*Air exposure for four hours

While the invention has been described in detail with respect to specific preferred embodiments thereof, it will be apparent to those skilled in the art upon a reading of the foregoing that numerous variations may be made thereto without departing from the scope of the invention or the appended claims.

What is claimed is:

1. A method of making a catalyst composition comprising an aluminum-stabilized ceria, the method comprising:
   (a) impregnating bulk ceria or a bulk ceria precursor with a liquid dispersion of an aluminum-stabilizer precursor; and
   (b) calcining the impregnated ceria obtained from step (a).

2. The method of claim 1 including (c) subsequent to the calcining of the impregnated ceria, dispersing one or more non-rhodium platinum group metal catalytic components on the ceria.

3. The method of claim 1 wherein the liquid dispersion of the aluminum-stabilizer precursor comprises an aqueous solution of an aluminum compound with which the ceria or ceria precursor is impregnated.

4. The method of claim 1 including incorporating sufficient aluminum-stabilizer precursor into the ceria to provide not more than about 20 weight percent aluminum, measured as $Al_2O_3$, based on the total weight of the stabilized ceria.

5. The method of claim 4 including incorporating sufficient aluminum-stabilizer precursor into the ceria to provide from about 5 to about 10 weight percent aluminum, measured as $Al_2O_3$, based on the total weight of the stabilized ceria.

6. The method of claim 4 including incorporating sufficient aluminum-stabilizer precursor into the ceria to provide from about 0.05 to about 5 weight percent aluminum, measured as $Al_2O_3$, based on the total weight of the stabilized ceria.

7. The method of any one of claims 1, 2, 3, 4, 5 or 6 including mixing with the stabilized ceria an activated alumina on which one or more platinum group metal catalytic components are dispersed, to form an alumina-ceria mixture.

8. The method of any one of claims 1, 2, 3, 4, 5 or 6 wherein the liquid dispersion of the aluminum-stabilizer precursor comprises an aqueous solution of aluminum nitrate.

9. The method of any one of claims 1, 2, 3, 4, 5 or 6 including carrying out the calcining of step (b) at a temperature of from about 300° C. to about 600° C.

10. The method of claim 9 including carrying out the calcining for a period of at least about one-half hour.

11. The method of claim 9 including carrying out the calcining of step (b) in air.

12. The method of claim 7 including mixing the ceria and alumina in proportions to provide a catalyst material comprising from about 5 to 95 weight percent of aluminum-stabilized ceria.

13. The method of claim 7 including applying a coating of the alumina-ceria mixture to a carrier substrate.

14. A method of making a catalyst composition comprising a mixture of an activated alumina and an aluminum-stabilized ceria and one or more platinum group metal catalytic components including at least one platinum group catalytic component other than rhodium, the method comprising:
   (a) impregnating bulk ceria or a bulk ceria precursor with a liquid dispersion of an aluminum-stabilizer precursor and calcining the impregnated ceria to provide an aluminum-stabilized ceria;
   (b) combining the ceria from step (a) with an activated alumina to form a mixture of alumina and aluminum-stabilized ceria; and
   (c) dispersing one or more platinum group metal catalytic components on at least one of the aluminum-stabilized ceria, the activated alumina, and the mixture thereof, with the proviso that, only platinum group catalytic components other than rhodium are deposited on the ceria.

15. A method of making a catalyst composition comprising a mixture of an activated alumina and an aluminum-stabilized ceria and one or more platinum group metal catalytic components, the method comprising:
   (a) dispersing one or more platinum group metal catalytic components on an activated alumina;

(b) impregnating bulk ceria or a bulk ceria precursor with a liquid dispersion of an aluminum-stabilizer precursor and calcining the impregnated ceria to provide an aluminum-stabilized ceria;

(c) dispersing one or more non-rhodium platinum group metal components on the aluminum-stabilized ceria; and (d) combining the ceria from step (b) with the activated alumina to form an alumina-ceria mixture.

16. The method of claim 15 further including:

(e) applying a coating of the mixture of alumina and aluminum-stabilized ceria to a carrier substrate; and (f) calcining the substrate coated with the mixture.

17. The method of claim 16 including carrying out the calcining of step (b) at a temperature of not more than about 350° C.

18. The method of claim 17 including carrying out the calcining in air.

19. The method of claim 15 further including:

(e) impregnating at least the activated alumina with a solution of a thermal stabilizer precursor chosen from the group consisting of precursors for rare earth metal oxides, alkaline earth metal oxides, zirconia, titania, hafnia, silicon dioxide and mixtures thereof,; and (f) calcining the stabilizer-impregnated activated alumina.

20. The method of claim 19 including carrying out the calcining of step (f) at a temperature of not more than about 350° C.

21. The method of claim 20 including carrying out the calcining of step (f) in air.

22. The method of claim 19 wherein the activated alumina which is impregnated with the solution of the thermal stabilizer precursor is an unstabilized activated alumina.

23. The method of claim 19 wherein the thermal stabilizer precursor comprises a mixture of a barium compound and a lanthanum compound.

24. The method of claim 7 including dispersing onto at least the activated alumina a modifier selected from the group consisting of one or more of alkaline earth metal oxides, rare earth metal oxides, silicon dioxide, Group IVB metal oxides, chromium oxide, iron oxide, nickel oxide, and precursors thereof.

25. The method of claim 14 or claim 15 including dispersing onto at least the activated alumina a modifier selected from the group consisting of one or more alkaline earth metal oxides, rare earth metal oxides, silicon dioxide, Group IVB metal oxides, chromium oxide, iron oxide, nickel oxide, or precursors thereof.

26. The method of any one of claims 2, 14, or 15 wherein the one or more non-rhodium platinum group metal catalytic components comprise a platinum component.

27. The method of any one of claims 1, 2, 3, 4, 5, 6, 14 or 15 wherein the aluminum-stabilized ceria has a particle size range such that at least 95% by weight of the particles has a diameter of greater than 0.5 microns.

28. The method of any one of claims 1, 2, 3, 4, 5, 6, 14 or 15 wherein ceria is added as a component in a mixture of rare earth oxides, the ceria comprising at least about 90 weight percent measured as $CeO_2$, of the total of rare earth oxide constituents exclusive of its aluminum-stabilizer content.

29. The method of any one of claims 1, 2, 3, 4, 5, 6, 14 or 15 wherein ceria is added as a component in a mixture of rare earth oxides the ceria comprising at least about 95 weight percent measured as $CeO_2$, of the total of rare earth oxide constituents exclusive of its aluminum-stabilizer content.

30. The method of any one of claims 1, 2, 3, 4, 5, 6, 14 or 15 wherein ceria is added as a component in a mixture of rare earth oxides the ceria comprising at least about 99 weight percent measured as $CeO_2$, of the total of rare earth oxide constituents exclusive of its aluminum-stabilizer content.

31. The method of claim 14 or claim 15 including combining the aluminum-stabilized ceria and alumina in proportions to provide a catalyst material comprising from about 5 to about 95 weight percent aluminum-stabilized ceria.

32. A catalyst composition comprising aluminum-stabilized bulk ceria containing not more than about 20% by weight aluminum, measured as $Al_2O_3$, based on the total weight of stabilized ceria.

33. The catalyst composition of claim 32 including the one or more non-rhodium platinum group metal catalytic components dispersed on the aluminum-stabilized ceria.

34. The catalyst composition of claim 32 or claim 33 further including activated alumina having one or more platinum group metal catalytic components dispersed thereon, said ceria and said alumina being dispersed together on a carrier substrate as a catalytic coating.

35. The catalyst composition of claim 32 or claim 33 wherein the aluminum-stabilized ceria contains from about 5 to about 10 weight percent aluminum, measured as $Al_2O_3$, based on the total weight of stabilized ceria.

36. The catalyst composition of claim 32 or claim 33 wherein the aluminum-stabilized ceria contains from about 0.05 to about 5 weight percent aluminum, measured as $Al_2O_3$, based on the total weight of stabilized ceria.

37. The catalyst composition of claim 34 wherein the aluminum-stabilized ceria and the activated alumina plus the catalytic components respectively dispersed thereon, comprise a calcined coating on a carrier substrate.

38. The catalyst composition of claim 34 wherein the stabilized ceria comprises from about 5 to 95 weight percent of the catalyst composition.

39. The catalyst composition of claim 32 or claim 34 wherein the aluminum-stabilized ceria has a particle size range such that at least 95% by weight of the particles have a diameter greater than 0.5 microns.

40. The catalyst composition of claim 32 or claim 33 wherein rare earth oxide constituents other than ceria are present in the catalyst composition the aluminum-stabilized ceria comprising at least about 90 weight percent measured as $CeO_2$, of the total of rare earth oxide constituents exclusive of its aluminum-stabilizer content.

41. The catalyst composition of claim 32 or claim 33 wherein rare earth oxide constituents other than ceria are present in the catalyst composition, the aluminum-stabilized ceria comprising at least about 95 weight percent measured as $CeO_2$, of the total of rare earth oxide constituents exclusive of its aluminum-stabilizer content.

42. The catalyst composition of claim 32 or claim 33 wherein rare earth oxide constituents other than ceria are present in the catalyst composition, the aluminum-stabilized ceria comprising at least about 99 weight percent measured as $CeO_2$, of the total or rare earth oxide constituents exclusive of its aluminum-stabilizer content.

43. The catalyst composition of claim 34 wherein at least the activated alumina dispersed together with the aluminum-stabilized ceria includes a modifier, distinct from said aluminum-stabilized ceria selected from the group consisting of one or more of alkaline earth metal oxides, rare earth metal oxides, silicon dioxide, Group IVB metal oxides, chromium oxide, iron oxide, nickel oxide, and precursors thereof.

44. The catalyst composition of claim 34 wherein the one or more platinum group metal catalytic components comprise a platinum component.

45. The catalyst composition of claim 34 wherein the one or more platinum group metal catalytic components comprise a palladium component.

46. The catalyst composition of claim 34 wherein the one or more platinum group metal catalytic components comprise a platinum component and a palladium component.

47. The catalyst composition of claim 34 wherein the one or more platinum group metal catalytic components dispersed on said activated alumina comprise a palladium component and a rhodium component.

48. The catalyst composition of claim 34 wherein the one or more platinum group metal catalytic components dispersed on said activated alumina comprise a platinum component and a rhodium component.

49. The catalyst composition of claim 33 wherein the one or more non-rhodium platinum group metal catalytic components dispersed on the ceria comprises platinum.

50. The catalyst composition of claim 32 wherein the aluminum-stabilized ceria is coated upon a carrier substrate.

51. The catalyst composition of claim 34 wherein the aluminum-stabilized ceria and the activated alumina having one or more platinum group metal catalytic components dispersed thereon, is coated upon a carrier substrate.

52. The catalyst composition of claim 50 or claim 51 wherein the carrier substrate has a plurality of gas flow passages extending therethrough, the gas flow passages being defined by walls which are coated with the catalyst composition.

* * * * *